(12) United States Patent
Vernick

(10) Patent No.: US 8,233,024 B2
(45) Date of Patent: Jul. 31, 2012

(54) AFFECTING CALLS TO A PERSON ASSOCIATED WITH A TELECOMMUNICATIONS TERMINAL BASED ON VISUAL IMAGES AND AUDIO SAMPLES OF THE ENVIRONMENT IN THE VICINITY OF THE TELECOMMUNICATIONS TERMINAL

(75) Inventor: Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 420 days.

(21) Appl. No.: 12/553,626

(22) Filed: Sep. 3, 2009

(65) Prior Publication Data

US 2011/0051919 A1  Mar. 3, 2011

(51) Int. Cl.
*H04N 7/14* (2006.01)
(52) U.S. Cl. ............... 348/14.01; 348/14.08; 348/14.09
(58) Field of Classification Search .... 348/14.01–14.03, 348/14.05, 14.08–14.09, 14.1, 14.12
See application file for complete search history.

(56) References Cited

U.S. PATENT DOCUMENTS 8,063,929 B2 * 11/2011 Kurtz et al. ............... 348/14.08

FOREIGN PATENT DOCUMENTS

WO  WO 99/57900  * 11/1999

* cited by examiner

*Primary Examiner* — Suhan Ni
(74) *Attorney, Agent, or Firm* — Maldjian Law Group LLC; John P. Maldjian, Esq.; Alexander D. Walter, Esq.

(57) ABSTRACT

A video camera and microphone associated with a telecommunications terminal are used to gather information about the environment in the vicinity of the telecommunications terminal. Such information includes, but is not limited to: (i) how many people are in the environment, (ii) which specific people are in the environment, (iii) if the environment is dark, (iv) if the environment is quiet, and (v) if the environment comprises human speech. When a specific person is associated with the telecommunications terminal and a request arrives to establish a telephone call with that person, then the information about the environment can be used to decide whether: (1) to transmit the call to the telecommunications terminal, or (2) forward the call away from the telecommunications terminal.

13 Claims, 4 Drawing Sheets

AFFECTING CALLS TO A PERSON ASSOCIATED WITH A TELECOMMUNICATIONS TERMINAL BASED ON VISUAL IMAGES AND AUDIO SAMPLES OF THE ENVIRONMENT IN THE VICINITY OF THE TELECOMMUNICATIONS TERMINAL

FIELD OF THE INVENTION

The present invention relates to telecommunications in general, and, more particularly, to criteria for determining how telephone calls are handled.

BACKGROUND OF THE INVENTION

Telecommunications systems are increasingly complex and therefore the need exists for systems that are capable of intelligently handling telephone calls.

SUMMARY OF THE INVENTION

The present invention provides a technique for handling telephone calls that avoids some of the costs and disadvantages for doing so in the prior art.

In accordance with the illustrative embodiment, a video camera and microphone associated with a telecommunications terminal are used to gather information about the environment in the vicinity of the telecommunications terminal. Such information includes, but is not limited to:
 i. how many people are in the environment, and
 ii. which specific people are in the environment, and
 iii. if the environment is dark—which suggests that there is no one in the environment or that if there are people in the environment that they are sleeping and do not want to be disturbed, and
 v. if the environment is quiet, and
 vi. if the environment comprises human speech.

When a specific person is associated with the telecommunications terminal and a request arrives to establish a telephone call with that person, then the information about the environment can be used to decide whether:
 i. to transmit the call to the telecommunications terminal, or
 ii. forward the call away from the telecommunications terminal, or
 iii. to ask the user how to handle the call.

For example, if the information gathered from the video camera and microphone indicate that the person to whom the call is directed is in the environment alone and that the environment does not comprise human speech, then it suggests that the person is likely to be receptive to a telephone call, and, therefore, the telephone call is transmitted to the telecommunications terminal.

As an alternative example, if the information gathered from the video camera and microphone indicate that the environment is comprises no people, then the telephone call is forwarded away from the telecommunications terminal because no one is there to answer it.

As yet another alternative example, if the information gathered from the video camera and microphone indicate that the environment comprises two or more people and that the environment comprises human speech, then it suggests that the people do not want to be disturbed, and, therefore, the telephone call is forwarded away from the telecommunications terminal.

Furthermore, in all of these cases, the information gathered from the video camera and microphone affect what message is delivered to the caller. For example, "I am away from my office" versus "I am busy in a meeting."

The illustrative embodiment comprises: receiving: (i) a request to establish a telephone call to a person, wherein the person is associated with a telecommunications terminal, and (ii) a visual image of the environment in the vicinity of the telecommunications terminal; transmitting the call to the telecommunications terminal when the visual image indicates the presence of exactly one person in the environment; and forwarding the call away from the telecommunications terminal when the visual image indicates the presence of no people in the environment.

DETAILED DESCRIPTION

Figure 1:
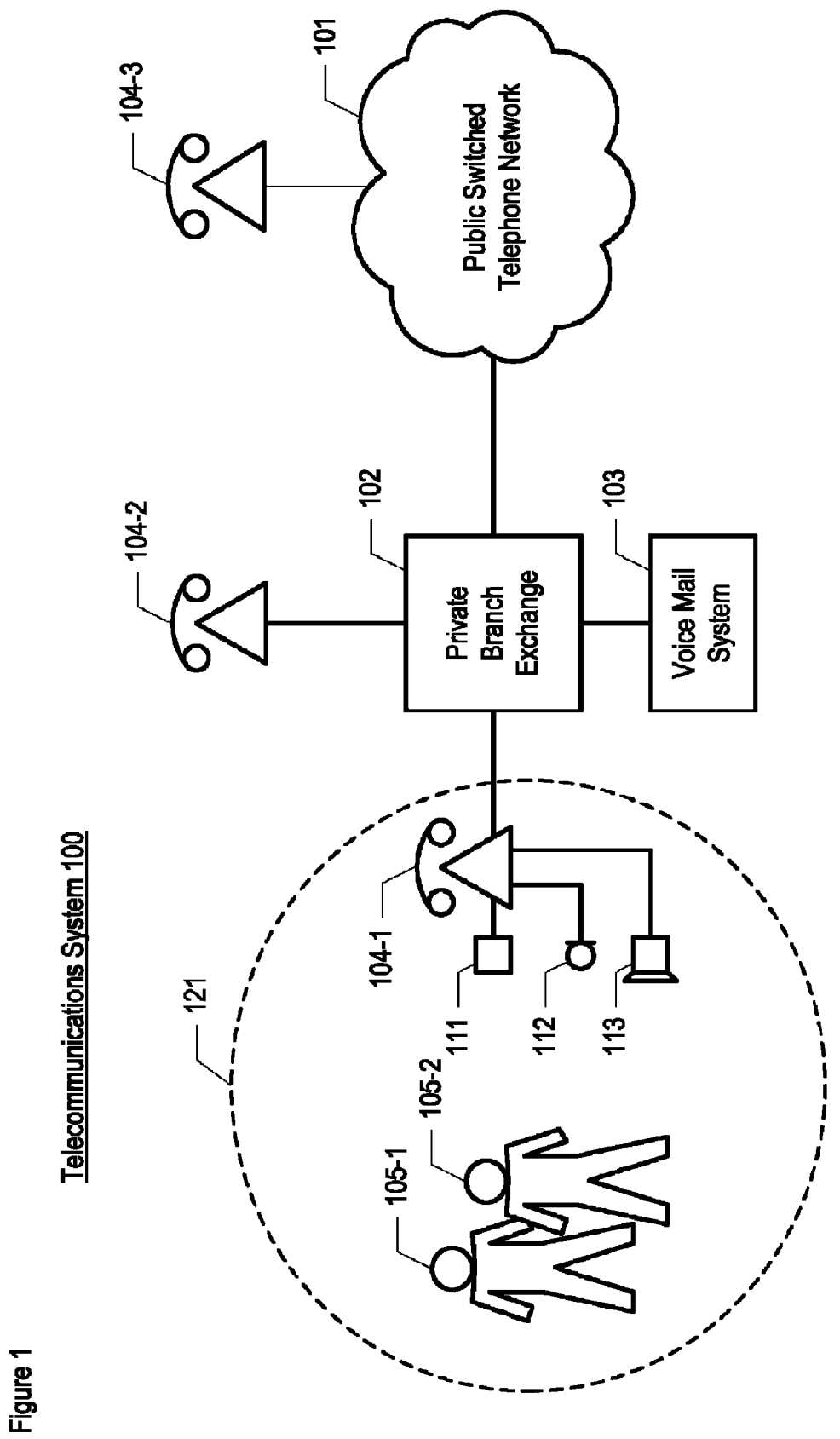
FIG. 1 is a schematic diagram of the salient components of telecommunications system 100 in accordance with the illustrative embodiment.

FIG. 1 is a schematic diagram of the salient components of telecommunications system 100 in accordance with the illustrative embodiment. Telecommunications system 100 comprises: Public Switched Telephone Network 101, private branch exchange 102, voice mail system 103, telecommunications terminals 104-1 through 103-4, video camera 111, microphone 112, speaker 113, and people 105-1 and 105-2, interrelated as shown. Telecommunications terminal 104-1, video camera 111, microphone 112, speaker 113, and people 105-1 and 105-2 are co-located within environment 121.

Although the illustrative embodiment comprises the Public Switched Telephone Network, it will be clear to those skilled in the art, after reading this disclosure, how to make and use alternative embodiments of the present invention that use any telecommunications network (e.g., the Internet, an internet protocol or "IP" network, etc.) or combination of telecommunications networks.

Although the illustrative embodiment comprises three telecommunications terminals, it will be clear to those skilled in the art, after reading this disclosure, how to make and use alternative embodiments of the present invention that use any number of telecommunications terminals.

Although the illustrative embodiment uses one video camera and one microphone to detect the presence or absence of people with environment 121, it will be clear to those skilled in the art, after reading this disclosure, how to make and use alternative embodiments of the present invention that comprise any number of video cameras and any number of microphones.

Public Switched Telephone Network 101 is the ubiquitous circuit-switched telephone system deployed throughout the World. It will be clear to those skilled in the art how to make and use equipment that interfaces with Public Switched Telephone Network 101.

Private branch exchange 102 is a machine that sets-up, conducts, and tears-down telephone calls, as described below and in the accompanying figures. For example, private branch exchange 102 is capable of receiving a request to set-up a telephone call from telecommunications terminal 104-1, 104-2, and 104-3 to any other terminal or voice mail system 103, as described below and in the accompanying figures.

Voice mail system 103 is a machine for recording voice mail messages, in well-known fashion.

Telecommunications terminals 104-1, 104-2, and 104-3 are capable of enabling one or more people to communicate using voice and video via Public Switched Telephone Network 101 and private branch exchange 102. Each of telecommunications terminals 104-1, 104-2, and 104-3 has associated with it:
 i. a video camera (e.g., video camera 111, etc.) for capturing one or more images in the vicinity of its terminal, and
 ii. a microphone (e.g., microphone 112, etc.) for capturing one or more audio samples in the vicinity of its terminal, and
 iii. a speaker (e.g., speaker 113, etc.) for transmitting audio—for both alerts and communication.

It will be clear to those skilled in the art how to make and use telecommunications terminals 104-1, 104-2, and 104-3.

People 105-1 and 105-2 are natural persons in the vicinity of telecommunications terminal 104-1. Person 105-1 is associated with—and is a user of—telecommunication terminal 104-1.

Figure 2:
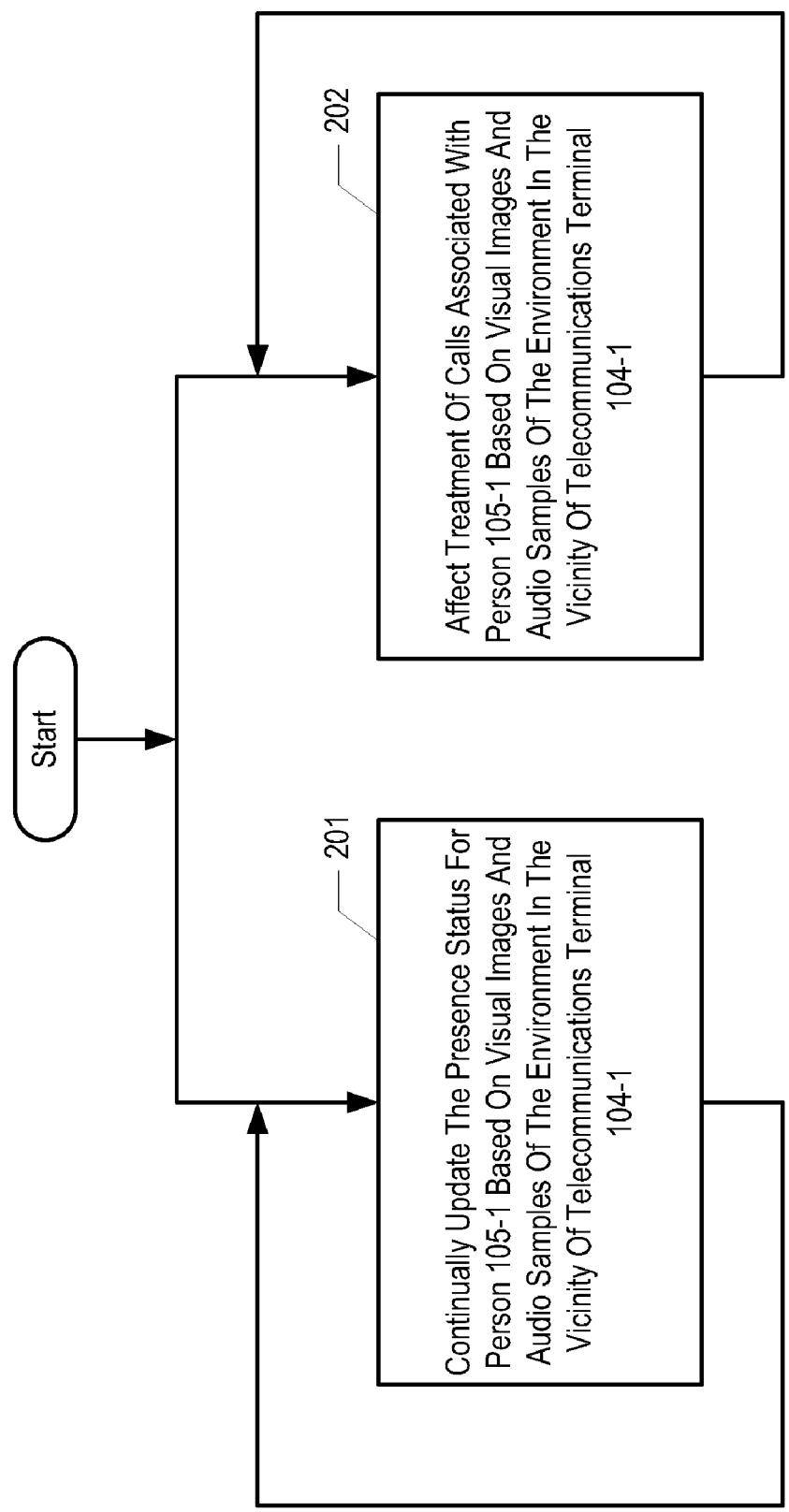
FIG. 2 is a flowchart of the salient tasks associated with the operation of the illustrative embodiment.

FIG. 2 is a flowchart of the salient tasks associated with the operation of the illustrative embodiment. In accordance with the illustrative embodiment, tasks 201 and 202 run concurrently, but it will be clear to those skilled in the art, after reading this disclosure, how to make and use alternative embodiments of the present invention in which tasks 201 and 202 have a different temporal relationship (e.g., occur sequentially, etc.).

At task 201, private branch exchange 102 continually updates the presence status for person 105-1 based on visual images and audio samples of the environment in the vicinity of telecommunications terminal 104-1. Task 201 is described in detail below and in FIG. 3.

At task 202, private branch exchange 102 affects the treatment of telephone calls associated with person 105-1 based on visual images and audio samples of the environment in the vicinity of telecommunications terminal 104-1. Task 202 is described in detail below and in FIG. 4.

Figure 3:
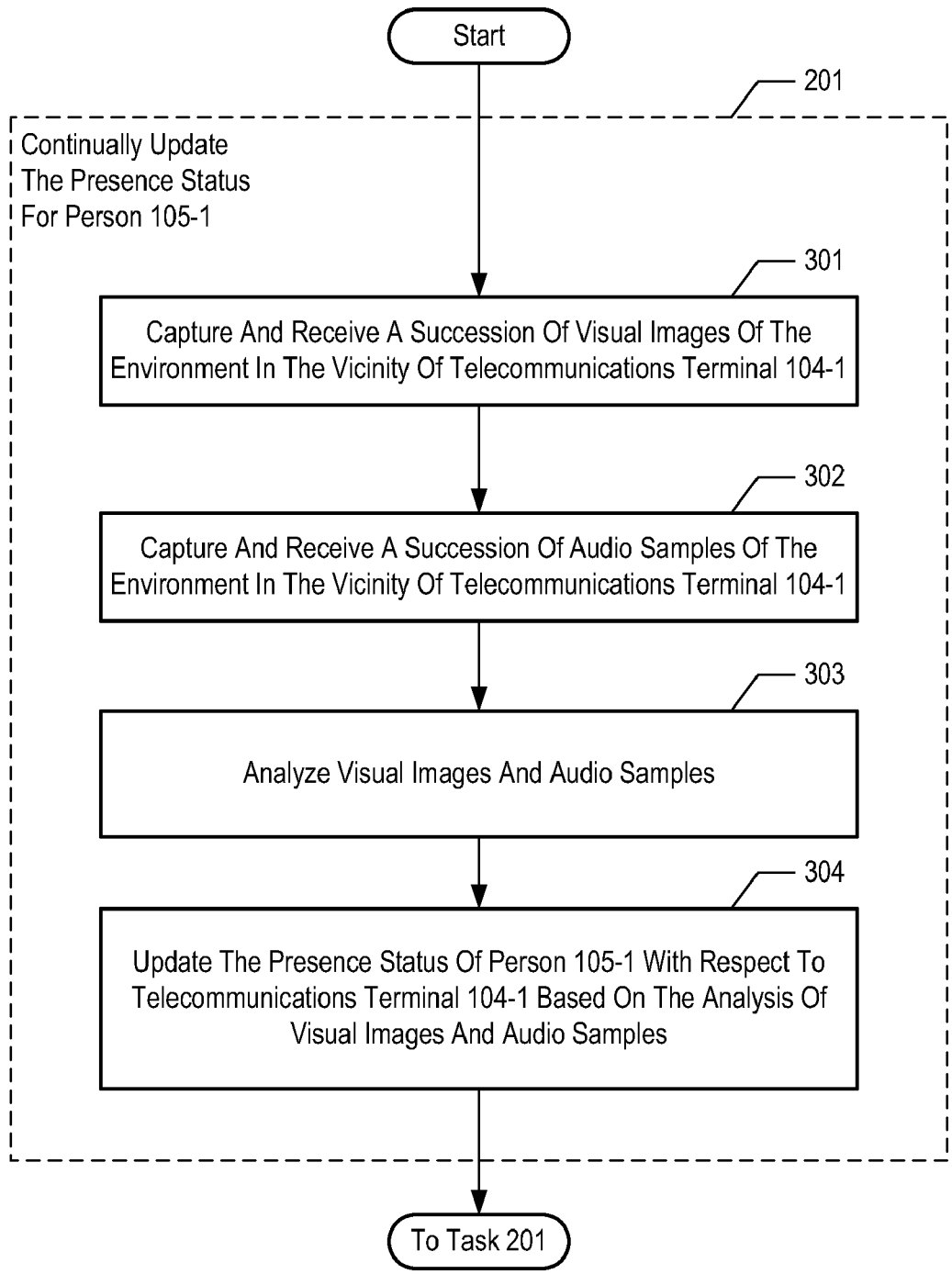
FIG. 3 is a flowchart of the salient tasks associated with the operation of task 201—updating the presence status for person 105-1.

FIG. 3 is a flowchart of the salient tasks associated with the operation of task 201—updating the presence status for person 105-1. In accordance with the illustrative embodiment, tasks 301, 302, 303, and 304 run continually and concurrently, but it will be clear to those skilled in the art, after reading this disclosure, how to make and use alternative embodiments of the present invention in which tasks 301, 302, 303, and 304 have a different temporal relationship (e.g., occur sequentially, etc.).

At task 301, video camera 111 captures a temporal succession of visual images of environment 121 and transmits them to private branch exchange 102, where they are received.

At task 302, microphone 112 captures a succession of audio samples of environment 121 and transmits them to private branch exchange 102, wherein they are received.

At task 303, private branch exchange 102 analyzes:
 i. the succession of visual images received in task 301, and
 ii. the succession of audio samples received in task 302 in well-known fashion to determine:
 i. how many people are in environment 121, and
 ii. if person 105-1 is in environment 121, and
 iii. if any person other than person 105-1 is in environment 121, and
 iv. if environment 121 is dark, and
 v. if environment 121 is quiet, and
 vi. if environment 121 comprises human speech.

At task 304, private branch exchange 102 updates the presence status of person 105-1 with respect to telecommunications terminal 104-1 to record:
 i. how many people are in environment 121, and
 ii. if person 105-1 is in environment 121, and
 iii. if any person other than person 105-1 is in environment 121, and
 iv. if environment 121 is dark, and
 v. if environment 121 is quiet, and
 vi. if environment 121 comprises human speech.

Figure 4:
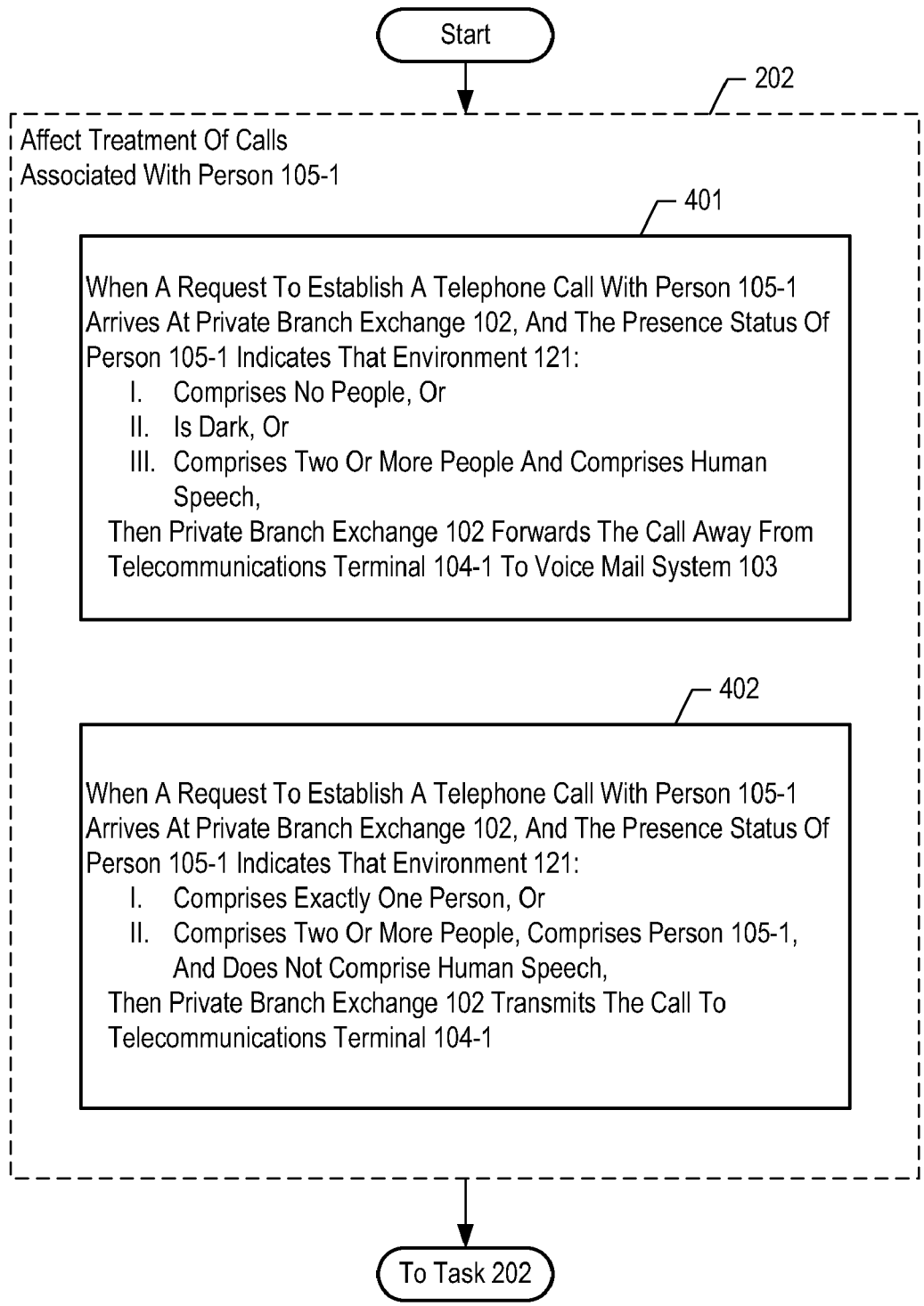
FIG. 4 is a flowchart of the salient tasks associated with the operation of task 202—affecting calls associated with telecommunications terminal 104-1 based on the presence status of person 105-1 determined in task 201.

FIG. 4 is a flowchart of the salient tasks associated with the operation of task 202—affecting calls associated with telecommunications terminal 104-1 based on the presence status of person 105-1 determined in task 201.

At task 401, when a request to establish a telephone call with person 105-1 arrives at private branch exchange 102, and the presence status of person 105-1 indicates that environment 121:
 i. comprises no people, or
 ii. is dark, or
 iii. comprises two or more people and comprises human speech,
then private branch exchange 102 forwards the call away from telecommunications terminal 104-1 to voice mail system 103. It will be clear to those skilled in the art, after reading this disclosure, how to make and use alternative embodiments of the present invention in which private branch exchange 102 forwards the call to another telecommunications terminal, system, or telephone number.

Furthermore, when the presence status of person 105-1 indicates that there are no people in environment 121, telecommunications terminal 104-1 is directed by private branch exchange 102 to execute maintenance tasks that would interfere with the use of telecommunications terminal 104-1 by a person.

At task 402, when a request to establish a telephone call with person 105-1 arrives at private branch exchange 102, and the presence status of person 105-1 indicates that environment 121:
 i. comprises exactly one person, or
 ii. comprises two or more people, comprises person 105-1, and does not comprise human speech,
then private branch exchange 102 transmits the call to telecommunications terminal 104-1.

Furthermore, when the presence status of person 105-1 indicates that there is exactly one person in environment 121 and that telecommunications terminal 104-1 is muted, then private branch exchange 102 directs telecommunications terminal 104-1 to issue a visual and audible un-mute signal to the person to remind them to un-mute the terminal.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
 receiving:
  (i) a request to establish a telephone call to a person, wherein the person is associated with a telecommunications terminal, and

(ii) a visual image of the environment in the vicinity of the telecommunications terminal;
(iii) an audio sample of the environment in the vicinity of the telecommunications terminal;
transmitting the call to the telecommunications terminal when the visual image indicates the presence of exactly one person in the environment;
forwarding the call away from the telecommunications terminal when the visual image indicates the presence of no people in the environment;
forwarding the call away from the telecommunications terminal when the visual image indicates the presence of two or more people in the environment and the audio sample comprises human speech; and
transmitting the call to the telecommunications terminal when the visual image indicates the presence of two or more people in the environment and the audio sample does not comprise human speech.

2. The method of claim 1 further comprising:
forwarding the call away from the telecommunications terminal when the visual image indicates that the environment is dark.

3. The method of claim 1 further comprising:
directing a maintenance task to be executed on the telecommunications terminal that prohibits the use of the telecommunications terminal by a person when the visual image indicates the presence of no people in the environment.

4. The method of claim 1 further comprising:
directing the telecommunications terminal to issue an un-mute signal when the telecommunications terminal is muted and when the visual image indicates the presence of exactly one person in the environment.

5. The method of claim 1 further comprising:
forwarding the call away from the telecommunications terminal when the visual image indicates that the environment is dark.

6. The method of claim 1 further comprising:
directing a maintenance task to be executed on the telecommunications terminal that prohibits the use of the telecommunications terminal by a person when the visual image indicates the presence of no people in the environment.

7. A method comprising:
receiving:
  (i) a request to establish a telephone call to a person, wherein the person is associated with a telecommunications terminal,
  (ii) a visual image of the environment in the vicinity of the telecommunications terminal, and
  (iii) an audio sample of the environment in the vicinity of the telecommunications terminal;
forwarding the call away from the telecommunications terminal when the visual image indicates the presence of two or more people in the environment and the audio sample comprises human speech; and
transmitting the call to the telecommunications terminal when the visual image indicates the presence of two or more people in the environment and the audio sample does not comprise human speech.

8. The method of claim 7 further comprising:
transmitting the call to the telecommunications terminal when the visual image indicates the presence of exactly one person in the environment; and
forwarding the call away from the telecommunications terminal when the visual image indicates the presence of no people in the environment.

9. The method of claim 7 further comprising:
forwarding the call away from the telecommunications terminal when the visual image indicates that the environment is dark.

10. The method of claim 7 further comprising:
directing a maintenance task to be executed on the telecommunications terminal that prohibits the use of the telecommunications terminal by a person when the visual image indicates the presence of no people in the environment.

11. The method of claim 7 further comprising:
directing the telecommunications terminal to issue an un-mute signal when the telecommunications terminal is muted and when the visual image indicates the presence of exactly one person in the environment.

12. A method comprising:
receiving:
  (i) a request to establish a telephone call to a person, wherein the person is associated with a telecommunications terminal, and
  (ii) a visual image of the environment in the vicinity of the telecommunications terminal;
transmitting the call to the telecommunications terminal when the visual image indicates the presence of exactly one person in the environment;
forwarding the call away from the telecommunications terminal when the visual image indicates the presence of no people in the environment; and
directing the telecommunications terminal to issue an un-mute signal when the telecommunications terminal is muted and when the visual image indicates the presence of exactly one person in the environment.

13. The method of claim 12 further comprising:
receiving:
  (iii) an audio sample of the environment in the vicinity of the telecommunications terminal;
forwarding the call away from the telecommunications terminal when the visual image indicates the presence of two or more people in the environment and the audio sample comprises human speech; and
transmitting the call to the telecommunications terminal when the visual image indicates the presence of two or more people in the environment and the audio sample does not comprise human speech.

* * * * *